United States Patent [19]
Hudson, Jr. et al.

[11] Patent Number: 5,195,477

[45] Date of Patent: Mar. 23, 1993

[54] COLD START FUEL ATOMIZER AND PROCESS

[75] Inventors: Sharon J. Hudson, Jr., Lambertville, Mich.; Richard J. Mazur, Sylvania, Ohio

[73] Assignee: Walbro Corporation, Cass City, Mich.

[21] Appl. No.: 805,088

[22] Filed: Dec. 11, 1991

[51] Int. Cl.⁵ .................... F02M 17/08; F02N 61/16
[52] U.S. Cl. ........................... 123/179.7; 123/1 A;
    123/445; 123/468; 29/890.143; 239/566;
    239/598; 239/601
[58] Field of Search ............... 123/179.7, 179.9, 468,
    123/445, 434, 1 A, 470, 453; 29/890.142,
    890.143, 890.1; 239/601, 566, 568, 598

[56] References Cited

U.S. PATENT DOCUMENTS

| | | | |
|---|---|---|---|
| 2,582,637 | 1/1952 | Leake | 123/179.7 |
| 2,728,384 | 12/1955 | Anderson | 239/566 |
| 2,834,635 | 5/1958 | Miller | 239/601 |

FOREIGN PATENT DOCUMENTS

| | | | |
|---|---|---|---|
| 2136529 | 1/1972 | Fed. Rep. of Germany | 123/468 |
| 2802226 | 10/1978 | Fed. Rep. of Germany | 123/179.7 |

Primary Examiner—Andrew M. Dolinar
Attorney, Agent, or Firm—Harold F. Mensing

[57] ABSTRACT

An apparatus for atomizing a gasoline-alcohol blend of automotive fuel and supplying a supplemental amount of vaporized fuel to the intake ports of an engine during cold weather start-up. Also a method of making the same. The apparatus comprises a tubular member having a plurality of configured atomizing orifices. It is positioned inside an engine air intake manifold with its orifice facing away from the intake port side of the manifold in an upstream direction. The orifices are formed by a stamping process wherein a die deforms the tube inwardly at each orifice site and ultimately punctures the tube wall producing a "T" shaped orifice opening with burred irregular edges and contoured sides. Preferably, each of the apertures is located between a pair of intake ports. Fuel is supplied to a head end of the tubular member, such as by means of an electromagnetic fuel injector, and the tail end of the member is closed.

21 Claims, 2 Drawing Sheets

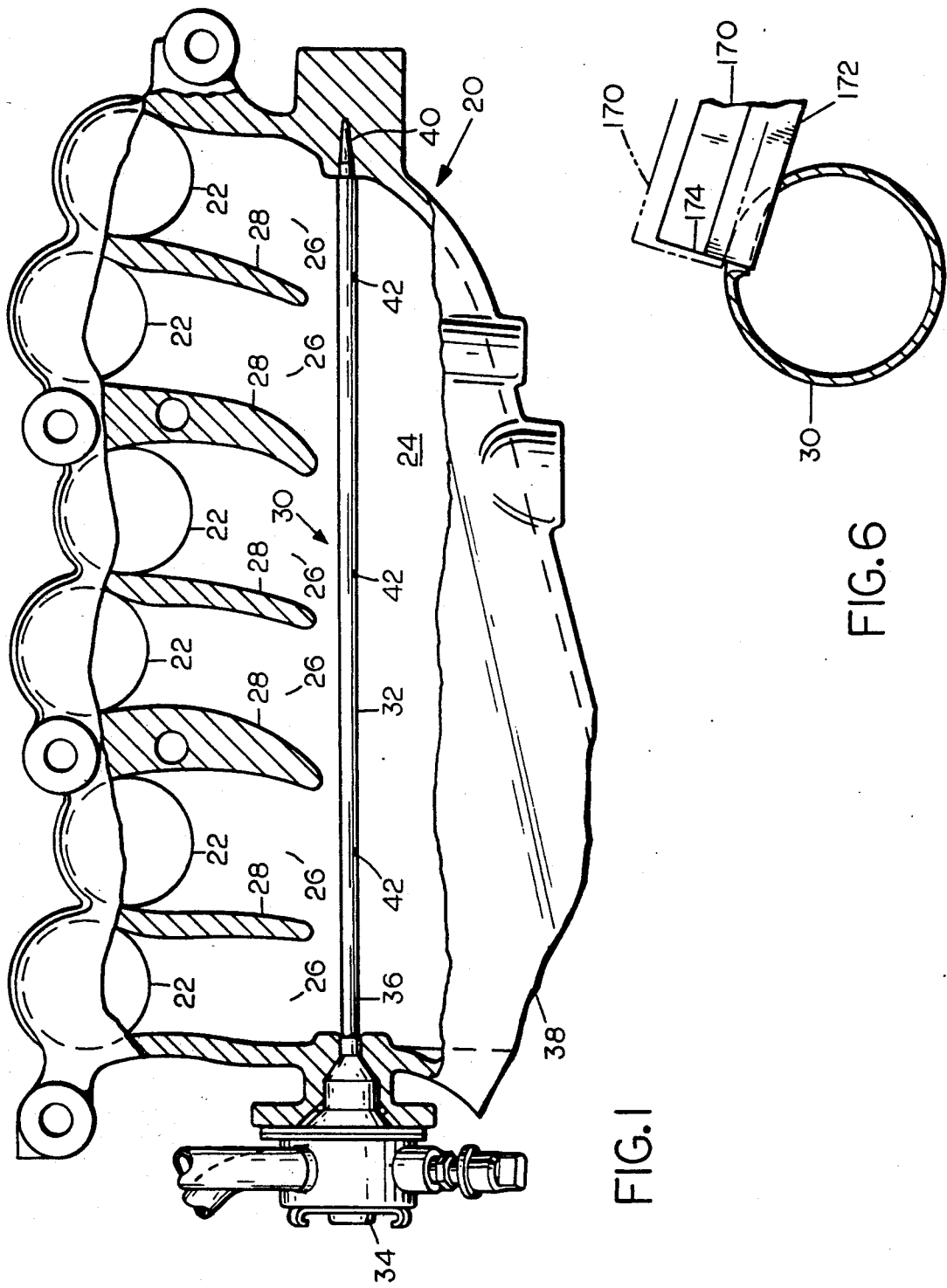

COLD START FUEL ATOMIZER AND PROCESS

BACKGROUND OF THE INVENTION

This invention relates to an internal combustion engine manifold apparatus for atomizing, during cold startups, a fuel blend containing gasoline and alcohol. More specifically, it relates to a tubular member having a plurality of specially designed orifices for atomizing the blended fuel under cold conditions and also relates to the orientation of the orifices in the manifold as well as the process of forming them.

Environmental concerns about hydrocarbon emissions from gasoline powered vehicle engines have led to the widespread use of petroleum fuels containing methanol. One of the problems encountered in using a gasoline-methanol blend of automotive fuel is that the methanol component of the fuel will not vaporize readily when the engine is cold and the ambient temperatures is below 32 degrees F. As a result engines using blended fuel containing alcohol were difficult to start when subjected to these conditions. The severity of the problem became worse when the percentage of methanol in the fuel was increased or the temperatures decreased.

Accordingly, it is a general object of this invention to provide an atomizing apparatus for injecting into the combustion air stream of an engine a supplemental amount of atomized fuel, in the form of a partially vaporized mist prior to its entry into the engine cylinder. It is another object of this invention to provide an orifice configuration which efficiently atomizes the fuel blend. It is still another object of this invention to further enhance vaporization of the fuel blend by maximizing the residence time of the atomized mist in the flow of combustion air in the manifold. It is yet another object of this invention to provide a simple and economic method for producing the desired orifice configuration in a tubular member.

SUMMARY OF THE INVENTION

Generally speaking, the improved manifold apparatus of this invention comprises an elongated tubular member having a fuel supply end and a closed end with a plurality of atomizing orifices arranged in a row on one side. It is mounted in a plenum section of an air intake manifold of a multiple piston type engine such that it traverses all of the manifold runners which distribute air from the plenum section to the engine's intake ports. The tubular member is oriented with its orifices facing away from these intake ports. The orifices are formed by a stamping die and method which produces three sided orifices having contoured sides that project into the interior of the tubular member and terminate at generally "T" shaped openings. Another significant feature of the orifice openings is that the stamping die and method used to part the metal and form the orifices produces a pronounced burr on the edges which define the orifice openings. These burred or jagged edges enhance atomization. Preferably, the orifices are limited in number and location so that each of them supplies atomized fuel to a pair of adjacent runners or cylinders. In order to maintain a sufficient fuel flow velocity in the barrel of the tubular member, its cross sectional area may be reduced by forming a concave groove longitudinally in the tubular member. A second tubular member having a cylindrical cross section, which matches the curvature of the concave groove, may be nested in the groove and bonded therein to stiffen the apertured tube.

The various features, their relationship to one another and their advantages will be understood best if the following description is read in conjunction with the accompanying drawings.

BRIEF DESCRIPTION OF THE DRAWINGS

FIG. 1 is a plan view of an air intake manifold with portions broken away to show the blended fuel atomizing assembly and various internal details of the manifold, FIG. 6 is a cross sectional view similar to FIG. 3 but additionally showing respectively, in phantom and full lines, two positions of the forming die for producing the atomizing orifice.

DETAILED DESCRIPTION OF THE INVENTION

Figure 4:
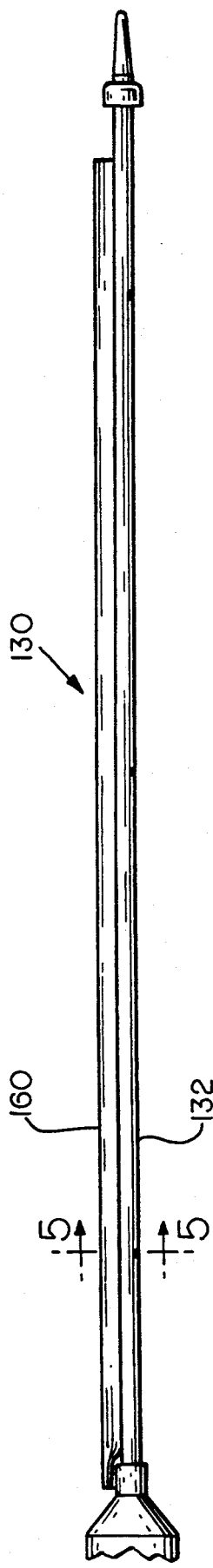
FIG. 4 is a side view of another atomizing assembly embodiment similar to the one shown in FIG. 1 but wherein the atomizing tube member has a longitudinal groove with a nested tubular spar.

The air intake manifold apparatus 20 illustrated in FIG. 1 distributes air to a plurality of intake ports 22 for the cylinders of an internal combustion engine. In this instance a six cylinder engine is involved. However, the invention is applicable to engines having more or fewer cylinders. The section 24 which extends from an open entrance end of the manifold, on the left side of the drawing, to a closed end on the other. The intake ports are disposed along one side of this plenum section. Individual passageways or runners 26 extend laterally from the plenum section to their respective intake ports. They are defined by the walls of the manifold and a plurality of partitions or web members 28.

A blended fuel atomizing assembly 30 is mounted in the plenum section of the intake manifold. It comprises a thin walled atomizing tube member 32 which has a programable means 34, preferably an electromagnetic fuel injector, for supplying fuel under pressure to an upstream end 36 located adjacent to the entrance end 38 of the manifold. The downstream or remote end 40 of the tubular member 32 is closed and may be tapered to a point. Opposite ends of the atomizing assembly are supported in aligned bores formed in the manifold shell. Tubular member 32 of the assembly has at least one atomizing orifice 42 on the side of the tubular member. Preferably, it has a plurality of spaced apart atomizing orifices 42 arranged in a straight axially disposed line along the tubular member. The orifices face away from the intake ports towards an opposite wall of the plenum section. This arrangement enhances vaporization of the atomized droplets, particularly the gasoline fraction of the fuel blend, by spraying it in a countercurrent direction relative to the incoming air stream. Vaporization is enhanced in two ways, first, by increasing the relative velocity of the air impinging on the surfaces of the droplets of the fuel blend and secondly, by increasing the residence time of the droplets in the air stream prior to being inducted into the engine's combustion chambers through the intake ports. Another feature which increases the residence time and thus enhances vaporization of the droplets is the fact that the tubular member is located on the intake port side of the plenum in close proximity to the upstream ends of the runners, as far away as is practical from the opposite wall of the plenum. Preferably, the number of atomizing orifices, the open area of each orifice and the cross sectional area of the atomizing tube are such that a substantially uniform atomizing pressure is maintained from end to end inside the tubular member. In this specific instance the most effective number of orifices was found to be three, that is one for each two adjacent intake ports. More or fewer orifices could be used under different circumstances.

Figure 2:
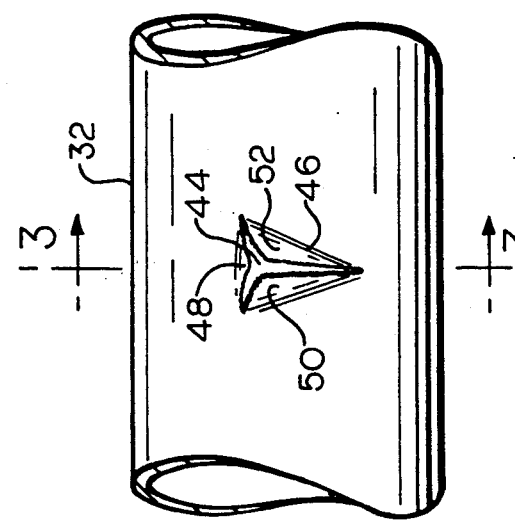
FIG. 2 is an enlarged side view of a section of the atomizing tube member of the atomizing assembly showing details of the atomizing orifice configuration.
Figure 3:
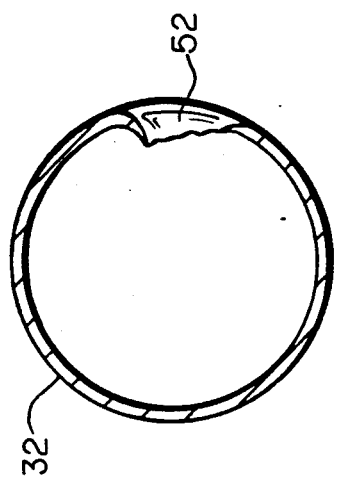
FIG. 3 is a cross sectional of the atomizing tube member taken along lines 3—3 of FIG. 2 showing additional details of the orifice configuration.

Other important features of this invention include the configuration of the orifices 42 and the method by which they are formed. Dealing first with their configuration, it will be noted that the actual opening 44 of each orifice is not level with the cylindrical surface of the tubular member but is at a radially inward end of a shallow indentation or horn section 46 of the orifice and is generally "T" shaped. For the purposes of this description the term generally "T" shaped opening is meant to include openings having three arm or finger sections extending laterally from a common site, such as openings having the shape of a "Y" with a flattened yoke. The horn section is defined by three laterally curved wall members 48, 50, 52 which flair outwardly from this "T" shaped orifice opening to a triangularly shaped outer end of the horn section formed by the merger of these wall members with the surrounding undeformed cylindrical surface of the tubular member (see FIGS. 2 and 3). Preferably, the "T" shaped opening defined by the inner edges of three flared wall members is oriented such that the longer leg or body portion of the "T" is perpendicular to the tubular axis and the shorter or top portion of the "T" is parallel to that axis. The edges of the orifice openings are burred edges. More specifically, they are defined as jagged irregular sharp edges which have been thinned by the tearing action of a die member acting by itself alone as it punctures the atomizing tube wall during the formation of an orifice (also see FIG. 6). Another significant feature of the "T" shaped orifice openings is the fact that their edges converge to points at the three distal ends of the "T". The burred or jagged edges and the narrow tapered slots provide a high ratio between the effective length of the perimeter of the "T" shaped opening and the actual area of the opening. In other words the atomizing orifice opening described above provides the atomized fuel stream with a relatively high surface-to-air exposure.

Figure 5:
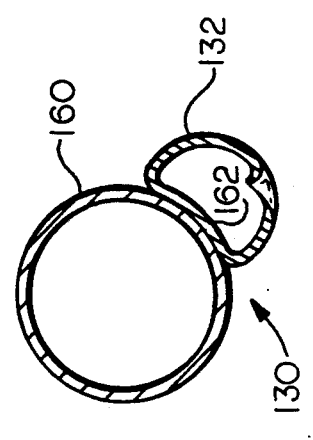
FIG. 5 is an enlarged cross sectional view taken along lines 5—5 of FIG. 4.

The atomizing tube assembly 130 shown in FIGS. 4 and 5 differs from the atomizing tube assembly 30 of the previously described embodiment in that the tube member 132 is provided with a longitudinal reinforcement in the form of a tubular spar 160. The reinforcing spar tube member 160 is made of the same tube stock as that of the atomizing tube member or of similar tube stock but is 50% larger in diameter. A concave groove 162, having the same radius as the spar tube member, is formed longitudinally in the underside of the atomizing tube member. The depth of the groove is such that the open cross sectional area of the atomizing tube member is reduced to less than 50% of its original size. The spar tube member is then nested in the groove and bonded thereto by brazing to provide greater stability. Preferably, the head end of the spar tube extends beyond the head end of the groove and is bonded to a fuel supply fitting 164 containing the head end of the atomizing tube member.

To produce the orifice in the atomizing tube, thin walled stainless steel tubing is used. In the instant case one-eighth inch diameter tube stock having a wall thickness of 0.007 of an inch is used. Tube stock having other dimensions could be used, if needed, but it is important that it be thin walled. For the purposes of this invention thin walled means a tube having a thickness to diameter ratio of about 1 to 20. The orifices are formed by means of a stamping die 170 having a cleaving edge 172 of ninety degrees, preferably. Dies with greater or lesser angles on their cleaving edges may be used but the results become less satisfactory as the deviation from the ninety degree angle increases. The die is mounted on the ram of a stamping press such that its cleaving edge is disposed at an obtuse angle relative to the travel axis of the ram. A piece of square die stock with a square end 174 and a pointed tip is preferred. It is positioned on its side with its longitudinal axis disposed laterally relative to the tube axis and is tilted such that the initial contact between the die and the tube occurs at an off-center point on the tube and at an intermediate point on the cleaving edge adjacent to the pointed end of the die, as illustrated in the phantom line position of the die in FIG. 6. In other words an intermediate portion of the die edge makes tangential contact with the tubular member before the pointed distal end of the die engages the tube. Movement of the die is vertical and after the initial contact occurs the continued downward advancement of the die initially deforms the adjacent portions of the tube and ultimately causes the die to puncture and tear the tube wall, as illustrated in the full line position of FIG. 6, and produce an orifice with flaired side walls and a "T" shaped opening defined by the burred, irregular or jagged inner edges of the flaired walls.

Even though the foregoing description was directed to the preferred embodiments of the invention as shown in the drawings, it is to be understood that various minor modifications may be made to these teachings without departing from the scope of the invention which is defined primarily by the appended claims.

What is claimed is:

1. An engine air intake manifold apparatus for atomizing a gasoline-alcohol blend of automotive fuel during cold start-up, said apparatus comprising: an atomizing tube member having a fuel supply end and a remote end, at least one atomizing orifice on a side of said tubular member, said orifice having a horn section defined by contoured side sections and a generally "T" shaped opening defined by the inner edges of said contoured side sections.

2. An engine air intake manifold apparatus according to claim 1 wherein said orifice defining edges are burred edges.

3. An engine air intake manifold apparatus according to claim 1 wherein the main stem of the "T" of said opening is laterally disposed relative to the longitudinal axis of said tubular member.

4. An engine air intake manifold apparatus according to claim 1 wherein each of the three distal ends of said generally "T" shaped opening is tapered to a point.

5. An engine air intake manifold apparatus according to claim 1 wherein said contoured sides diverge outwardly from said edges.

6. An engine air intake manifold apparatus according to claim 1 wherein said atomizing tube member has a plurality of said atomizing orifices aligned along one side thereof.

7. An engine air intake manifold apparatus according to claim 1 including an air intake manifold assembly having a plenum section along one side thereof, a plurality of cylinder intake ports along an opposite side thereof and a plurality of web members extending from said plenum section to said ports, said web members dividing intake air from said plenum section into a plurality of separate air streams and directing each of said separate air streams to its respective port, and wherein said atomizing tube member is located in the plenum section on the intake port side thereof.

8. An engine air intake manifold apparatus according to claim 7 wherein said atomizing tube member has a plurality of said atomizing orifices aligned along one side thereof, and wherein the number of said atomizing orifices is less than the number of web members.

9. An engine air intake manifold apparatus according to claim 8 wherein the number of said atomizing orifices is one-half the number of said intake ports.

10. An engine air intake manifold apparatus according to claim 7 wherein said atomizing orifice is disposed on the plenum side of said tubular member.

11. An engine air intake manifold apparatus according to claim 1 wherein said atomizing tube member has a longitudinally disposed groove, said groove reducing the original cross sectional area of the tube interior by at least 50%, and a reinforcing spar tube member nested in said groove and bonded to said atomizing tube member.

12. An improved engine air intake manifold apparatus for atomizing a gasoline-alcohol blend of automotive fuel during cold weather start-up, said apparatus having an air intake manifold assembly with a plenum section along one side thereof, a plurality of cylinder intake ports along an opposite side thereof and a plurality of web members extending from said plenum section to said ports for dividing intake air from said plenum section into a plurality of separate air streams and directing each of said separate air streams to its respective port, the improvement comprising: an atomizing tube assembly having a tubular member with a fuel supply end, a remote end, and at least one atomizing orifice intermediate said ends thereof, said tubular member being located in said plenum section adjacent to the inner ends of said web members, said atomizing orifice facing away from said ports towards an opposite wall of said plenum section.

13. An improved engine air intake manifold apparatus according to claim 12 wherein said tubular member has a plurality of atomizing orifices aligned along one side thereof, and wherein the number of said atomizing orifices is less than the number of web members.

14. An improved engine air intake manifold apparatus according to claim 13 wherein the number of said atomizing orifices is one-half the number of said intake ports.

15. An improved engine air intake manifold apparatus according to claim 12 wherein said orifice has a horn section defined by contoured side sections, and a generally "T" shaped opening defined by the inner edges of said contoured side sections.

16. An improved engine air intake manifold apparatus according to claim 15 wherein said orifice defining edges are burred edges.

17. An improved engine air intake manifold apparatus according to claim 15 wherein the main stem of the "T" of said opening is laterally disposed relative to the longitudinal axis of said tubular member.

18. An improved engine air intake manifold apparatus according to claim 15 wherein each of the three distal ends of said generally "T" shaped openings is tapered to a point.

19. An improved engine air intake manifold apparatus according to claim 15 wherein said contoured sides diverge outwardly from said edges.

20. A method of making an atomizing tube orifice for a fuel atomizer for an engine air intake manifold, said method comprising: mounting a die having a cleaving edge on a stamping press ram having an axial travel path such that said edge is disposed at an obtuse angle relative to said axial travel path, said die having a pointed end, placing a length of cylindrical tubing in a fixture in the travel path of said ram such that the axis of said tube is perpendicular to both the travel axis of the ram and the cleaving edge of said die and such that first contact between said die and said tube will be made between an off-center point on said tube and an intermediate point of said die edge, advancing said ram to bring said die edge into contact with said tube, continuing to advance said die until said pointed end punctures said tube to produce an orifice with ragged edges and contoured sides, and subsequently retracting said ram.

21. A method of making an atomizing tube orifice for a fuel atomizer for an engine air intake manifold according to claim 20 wherein said cleaving edge is formed by two planar edge surfaces disposed at ninety degrees relative to one another and said die end is square.

* * * * *